Dec. 4, 1951 E. O. SPEARS ET AL 2,577,379
SCREEN FRAME
Filed March 15, 1949 2 SHEETS—SHEET 1
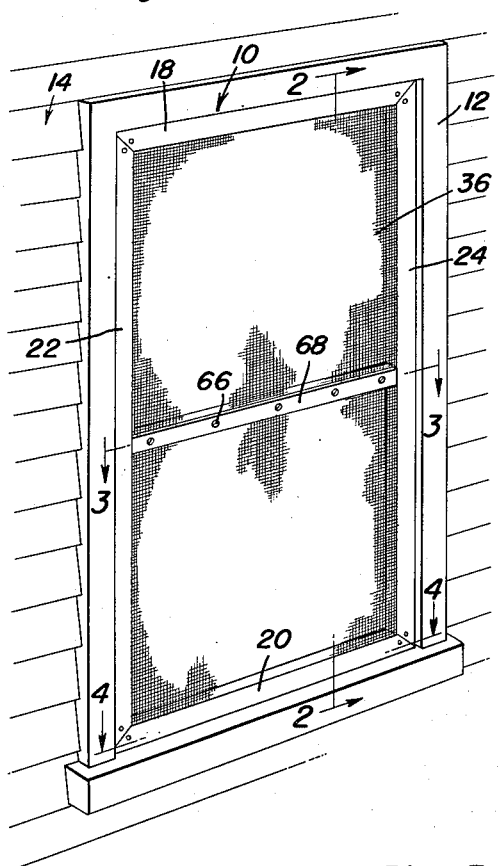
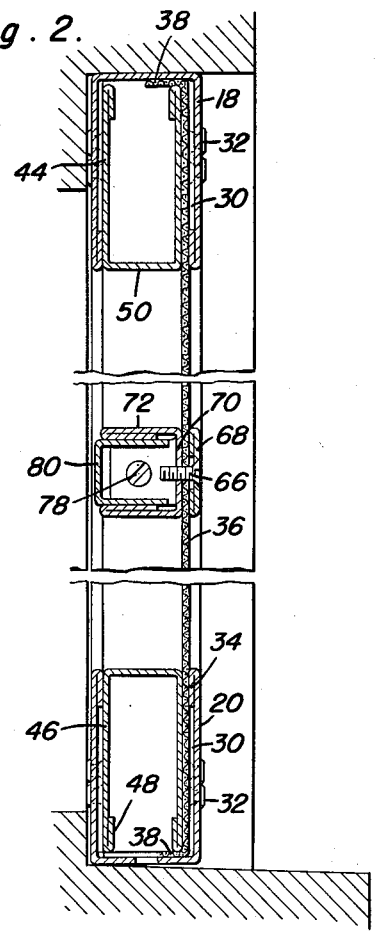
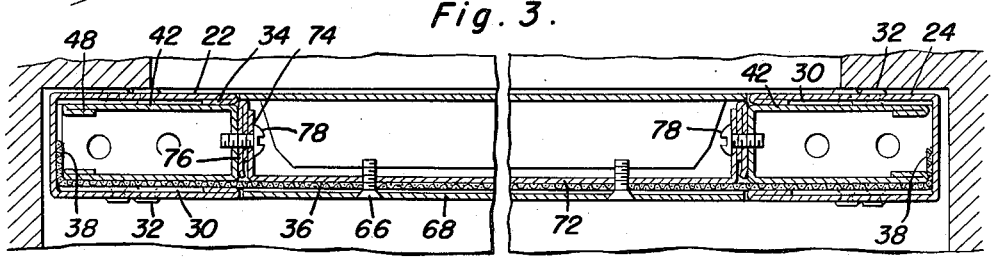
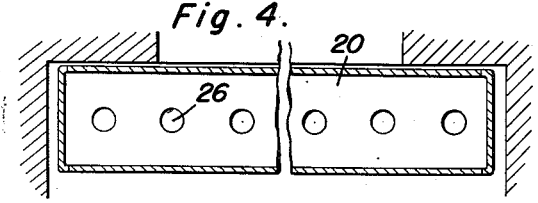
Inventors
Estes O. Spears
Raymond G. Clawitter
By Clarence A. O'Brien
and Harvey B. Jacobson
Attorneys Dec. 4, 1951 E. O. SPEARS ET AL 2,577,379
SCREEN FRAME
Filed March 15, 1949 2 SHEETS—SHEET 2

Inventors
Estes O. Spears
Raymond G. Clawitter

By Clarence A. O'Brien
and Harvey B. Jacobson
Attorneys

Patented Dec. 4, 1951

2,577,379

UNITED STATES PATENT OFFICE 2,577,379

SCREEN FRAME

Estes O. Spears and Raymond G. Clawitter, Little Rock, Ark., assignors of one-third to Osborne W. Garvin, Little Rock, Ark.

Application March 15, 1949, Serial No. 81,423

1 Claim. (Cl. 160—379)

This invention relates to a novel screen frame, the primary object of which is to permit the installation of screen wire without the use of nails and without the necessity of taking apart the outside frame.

Another object of this invention is to provide a discerptible frame fabricated of lightweight material, such as aluminum, which may be readily assembled and disassembled for supporting and replacing wire screens and in which the screen is held firmly in place by means of interlocking parts without the use of screws, brads or other attachments.

Yet another object of this invention is to provide a frame for removably supporting a screen comprising an outer substantially rectangular channel frame member, an inner discerptible substantially rectangular channel frame member slidably and lockingly retained within said outer frame member, said screen extending between said inner and outer frame members, and means supporting and preventing bending movement of the central portion of said screen.

These, together with various ancillary objects and features of the invention which will later become apparent as the following description proceeds, are attained by the device, a preferred embodiment of which has been illustrated by way of example only in the accompanying drawings, wherein:

Figure 1 is a side elevational view of the frame carrying a screen and positioned in a window frame;

Figure 2 is a longitudinal sectional view taken substantially on the plane of section line 2—2 of Figure 1;

Figure 3 is a transverse sectional view taken on the plane of section line 3—3 of Figure 1;

Figure 4 is another transverse sectional view taken on the plane of section line 4—4 of Figure 1;

Specific reference is now made to the drawings. In the several views in the accompanying drawings and in the following specification similar reference characters indicate corresponding elements throughout.

Indicated generally at 10 is the frame of the instant invention constructed of aluminum, copper, steel or the like and positioned within the sash of a window frame 12 provided in a building construction 14.

Figure 5:
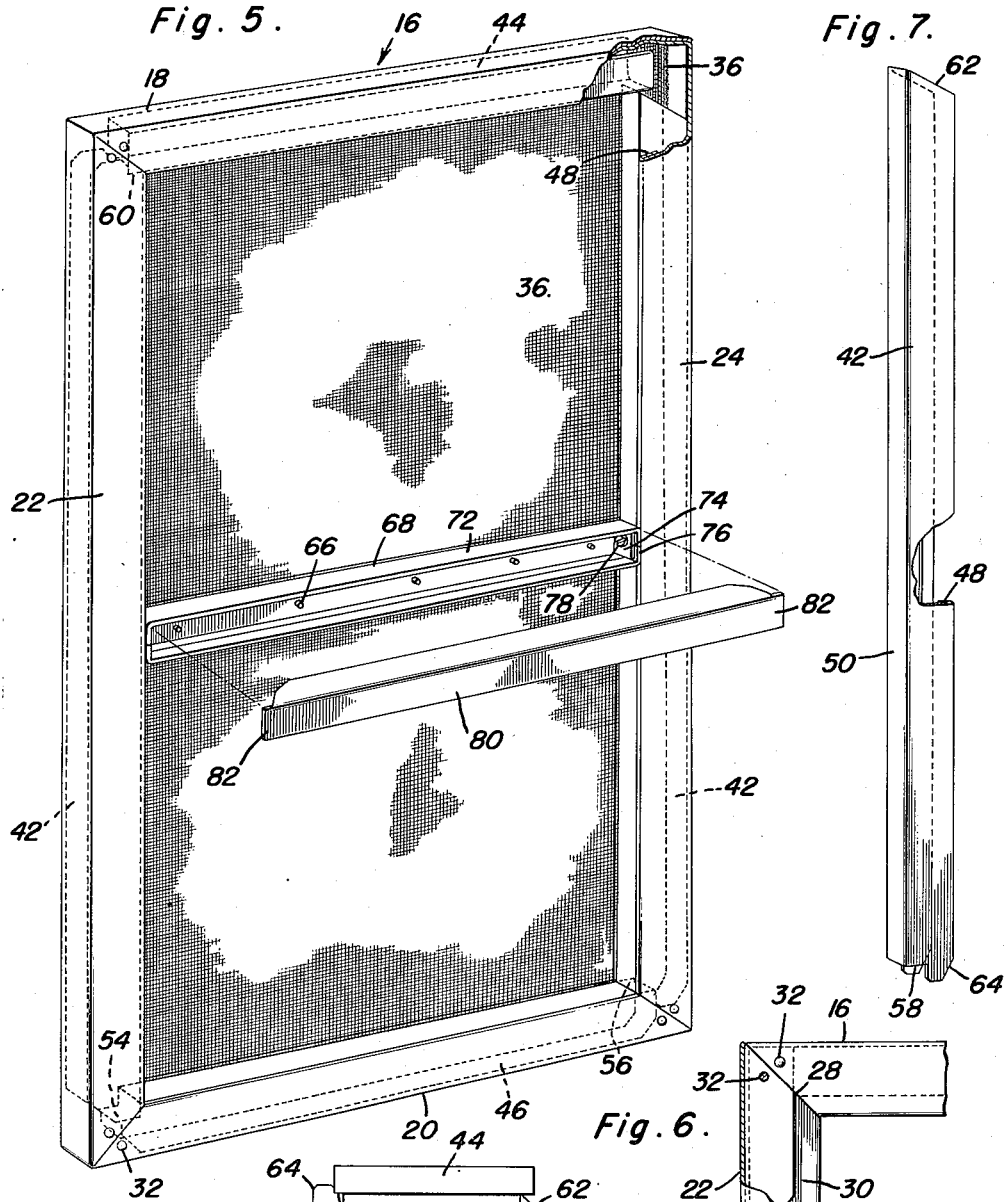
Figure 5 is a perspective view of the screen frame itself, parts being broken away, shown in section, shown in dotted lines, and separated from the screen to show details of construction.
Figure 7:
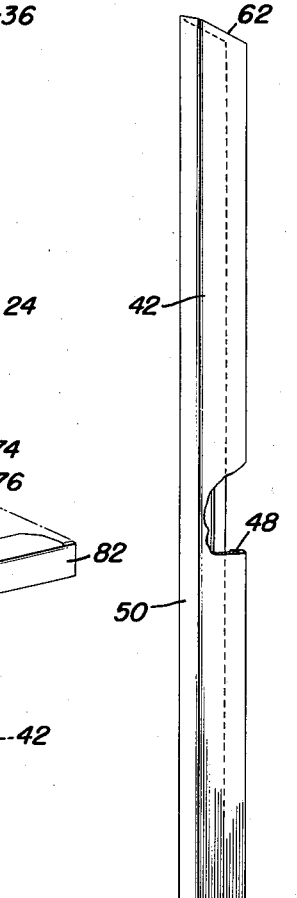
Figure 7 is a perspective view of one of the side pieces of the inner discerptible frame member.
Figure 6:
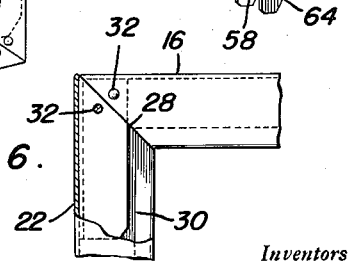
Figure 6 is an enlarged vertical sectional view through a corner of the outer frame member.
Figure 8:
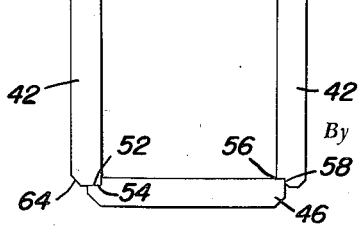
Figure 8 is a diagrammatic view illustrating the manner of connecting the pieces making up the inner frame member.

The frame consists of an outer frame member of trough-like or channel construction 16 having top and bottom members 18 and 20 and side members 22 and 24 connected thereto to provide a substantially rectangular frame. The bottom member 20 may be provided if desired with drainage ports 26. As shown clearly in Figures 2, 3 and 6, the corners of the outer frame are in effect overlapping and riveted to provide a unitary frame. At their ends, the frame members 18, 20, 22 and 24 are provided with abutting tapered edges 28. At one end of each of these frame members, a down struck portion 30 is provided which is received within the adjacent end of the next frame member, as shown clearly in Figure 6, to provide the overlapping relationship, the adjacent frame members being secured to each other at both sides of the tapered end 28 by means of rivets 32. It will be further noted that the free edges of the frame members are inturned as at 34 to avoid sharp edges and to further provide a close frictional fit for the inner frame members to be described hereinafter.

Positioned within the outer frame member 16 and towards the back thereof is a screen 36 which is longer and wider than the rectangular frame itself to provide overlapping portions 38. Slidably and frictionally retained within the outer frame 16 is an inner discerptible frame 40 which retains the screen in a taut position against the back inner surface of the outer frame member 16.

The inner discerptible frame consists of side members 42, a top member 44 and a bottom member 46. As in the case of the outer frame member, the free edges of the inner frame member are inturned as at 48 to avoid sharp edges. As will be seen clearly from the drawings, the inner frame members are frictionally retained in inverted position within the outer frame member. Inasmuch as the inner frame members are of channel construction, it will be seen that the web portions 50 thereof face inwardly of the outer frame member. The inner frame members 42, 44 and 46 are lockingly and removably retained by interengaging means within the outer frame member in the following manner. One of the side members 42 has a bottom free edge 52 which is received in a rectangular groove 54 at one free end of the bottom member 46. The other end of the bottom member 46 is provided with an edge 56 which is in turn received in a rectangular groove 58 at the bottom free end of the side member 42. The top member 44 has perpendicular free ends one of which is received in a rectangular groove or recess 60 at the upper free end of the first side member 42, while the other end of the top member 44 simply rests upon the tapered end 62 of the other side member 42. It will further be noted that the side members 42 and the bottom member 46 include tapered or rounded edges 64 which together with the tapered edges 62 of one of the side members 42 permits ready removal of the inner frame members from the outer frame member when desired.

When the screen is positioned within the outer frame member described hereinabove and the inner frame members 42, 44 and 46 are slidably and lockingly retained within the outer frame member 16 against the screen 36 the assembly is more or less complete at this point. However, a means is required for supporting and preventing bending movement of the central portion of the screen, which means will now be described. Centrally of the screen a plurality of transversely spaced apertures are provided for receiving screws 66 which extend therethrough and through apertures in a transversely extending plate 68 positioned against the back of the screen. The screws 66 also extend through a plurality of transversely spaced apertures in the web portion or bottom wall 70 of a transversely extending trough member 72 which are up struck at their ends as at 74 and abut the side members 76 of the trough 72. Headed screws 78 extend through the up struck portions 74 and the sides 76 of the trough 72 and are received in apertures provided centrally of the side members 42 of the inner frame 40. The trough member 72 frictionally and removably receives a closure member 80 in the form of an inverted channel member of substantially U-shaped construction. The web portion of this closure member includes extensions 82 which abut the web portions 50 of the side frame members 42 to provide a tight fit so that the proper tautness of the screen may be obtained.

Thus it will be seen that a novel screen frame is provided of lightweight metals which is relatively simple in construction and design, easy to assemble and disassemble, and extremely efficient for supporting a screen in the proper taut condition.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In combination with a screen, a frame for removably supporting the screen comprising an outer substantially rectangular channel frame member, an inner discerptible substantially rectangular channel frame member slidably and lockingly retained within said outer frame member, said screen extending between said inner and outer frame members, and means supporting and preventing bending movement of the central portion of said screen, said means including a transversely extending bar on one side of said screen, a transversely extending trough on the opposite side of said screen, said trough including side and end walls connected to a bottom wall, screw fastening means extending through said bar, said screen, and the bottom wall of said trough, and headed screws retaining the end walls of said trough on said inner frame member, said inner frame member including separable side, top and bottom pieces and interengaging means lockingly joining the pieces thereof, and a closure means for said trough, said closure means including a channel member including a web portion and legs slidably and frictionally received in said trough.

ESTES O. SPEARS.
RAYMOND G. CLAWITTER.

REFERENCES CITED

The following references are of record in the file of this patent:

UNITED STATES PATENTS

| Number | Name | Date |
| --- | --- | --- |
| 947,838 | McCrath | Feb. 1, 1910 |
| 1,026,501 | Etter | May 14, 1912 |
| 1,788,296 | Herndon | Jan. 6, 1931 |
| 2,042,726 | Mueller | June 2, 1936 |